(12) United States Patent
Konstantinovskiy

(10) Patent No.: US 7,631,609 B1
(45) Date of Patent: Dec. 15, 2009

(54) VERSATILE WATERCRAFT

(76) Inventor: Alexandr Konstantinovskiy, Tverskaya Oblast, Kimrskiy Raion, Kalinin Street, dom 32, Kimry (RU)

( * ) Notice: Subject to any disclaimer, the term of this patent is extended or adjusted under 35 U.S.C. 154(b) by 0 days.

(21) Appl. No.: 12/234,692

(22) Filed: Sep. 21, 2008

(51) Int. Cl.
*B63B 1/16* (2006.01)
*B63B 1/00* (2006.01)
*B63B 1/24* (2006.01)
*B63B 1/26* (2006.01)

(52) U.S. Cl. .................. 114/272; 114/271; 114/274

(58) Field of Classification Search ............ 114/312, 114/313, 337, 271, 272, 274; 244/105, 106
See application file for complete search history.

(56) References Cited

U.S. PATENT DOCUMENTS

| | | | | |
|---|---|---|---|---|
| 1,726,439 A | * | 8/1929 | Korvin-Kroukovsky | 114/290 |
| 2,272,661 A | * | 2/1942 | Finley | 114/272 |
| 2,804,038 A | * | 8/1957 | Barkla | 114/272 |
| 3,223,066 A | * | 12/1965 | Irving | 114/273 |
| 5,727,495 A | * | 3/1998 | Reslein | 114/272 |
| 6,592,073 B1 | * | 7/2003 | Meekins | 244/105 |
| 7,059,259 B2 | | 6/2006 | Allen | |
| 7,328,668 B2 | | 2/2008 | Guerard | |
| 7,334,756 B2 | | 2/2008 | Martirosov | |
| 7,398,740 B2 | | 6/2008 | Boncodin | |

OTHER PUBLICATIONS

Wing In Ground-effect Vehicle—Wikipedia, the Free Encyclopedia, http://en.wikipedia.org/wiki/Wing-In-Ground_effect_vehicle, printed from the Internet on Sep. 15, 2008, 4 pages.
Ekranoplan—Wikipedia, the Free Encyclopedia, http://en.wikipedia.org/wiki/Ekranoplan, printed from the Internet on Sep. 15, 2008, 3 pages.
Boeing Pelican—Wikipedia, the Free Encyclopedia, http://en.wikipedia.org/wiki/Boeing_Pelican, printed from the Internet on Sep. 16, 2008, 2 pages.
Beriev Be-2500—Wikipedia, the Free Encyclopedia, http://en.wikipedia.org/wiki/Beriev_Be-2500, printed from the Internet on Sep. 16, 2008, 2 pages.

* cited by examiner

*Primary Examiner*—Lars A Olson
*Assistant Examiner*—Daniel V Venne
(74) *Attorney, Agent, or Firm*—Alexey Bakman, Esq

(57) ABSTRACT

A versatile watercraft of the present invention comprises a base wing, a C-wing, and preferably a plurality of vertical stabilization knives. The base wing extends horizontally from the right side of the watercraft to the left side of the watercraft, and longitudinally, for at least a third of the length of the watercraft. The C-wing, extends above the base wing. The C-wing is comprised of at least two essentially vertical walls and an essentially horizontal top. The watercraft also comprises at least one propulsion device. In the preferred embodiments, a plurality of vertical stabilization knives extends vertically below the base wing and extends longitudinally for at least a third of the length of the watercraft.

15 Claims, 4 Drawing Sheets

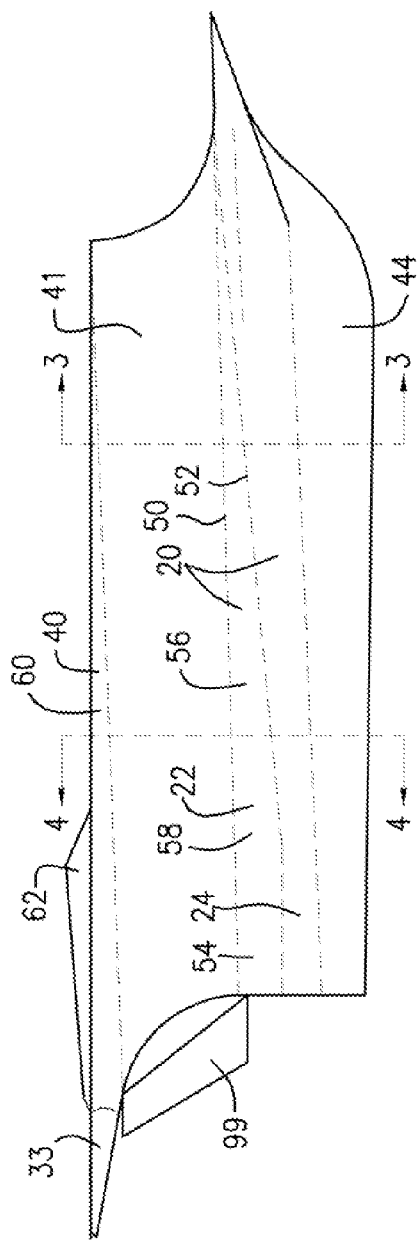
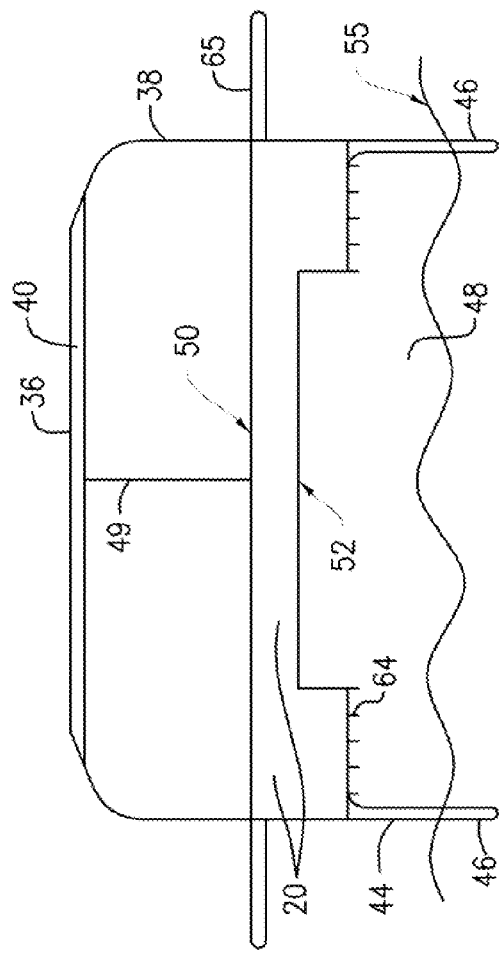

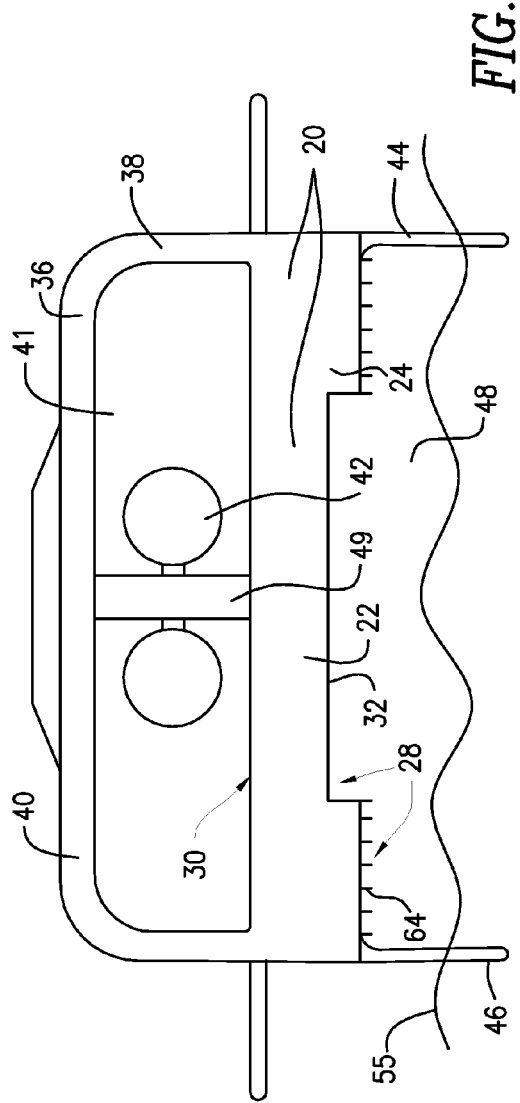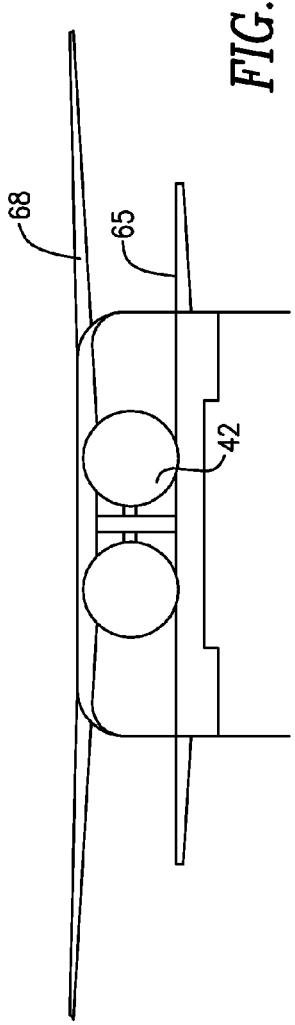

VERSATILE WATERCRAFT

FIELD OF THE INVENTION

The field of the present invention is watercraft, and more particularly, a new type of high-speed amphibious watercraft with advanced capabilities.

BACKGROUND OF THE INVENTION

Speedboats have a major shortcoming. Although they may be fast and powerful, speedboats are extremely inefficient. Even in gliding mode, many speedboats maintain considerable contact with water. The resistance of water (as compared to the resistance of air) requires tremendous expenditures of fuel from ships moving at high speeds. As vessels "plow the water," or as gliding vessels strike the surface of the water, much energy is lost to friction. For example, fuel consumption by a ship exceeds several-fold the consumption by a truck of similar size, traveling on wheels over the surface.

Speedboats present may safety hazards. A boat moving at high speeds, in direct contact with the surface of the water faces the risk of puncturing the hull by colliding with debris or hitting a reef, just under the surface of the water. In choppy seas, speedboats may capsize or sustain structural damage from stress caused by collision with the waves at high speeds and wrong angles. The resistance of water can at any time turn the kinetic energy of a fast-moving vessel against that vessel, as it collides and "burrows" into a wave. In order to prevent such occurrences, speedboats must limit their speed in anything but the calmest waters. As planing is impossible at low speeds, the fuel consumption is further increased.

Vessels on hydrofoils also present many shortcomings. Stability at high speed is compromised. Maneuverability at high speeds is limited. The wing-like foils are vulnerable to collisions and damage with floating debris. Functionality of the foils is reduced in the presence of waves, as foils, with small area of support underneath, sink into the waves.

Many vessels on hydrofoils rely on the use of special turbines for channeling air under the hull to raise the vessel onto the foils. Such turbines are an additional and significant source of power consumption. Furthermore, the foils are usually installed at an angle to the horizontal surface. The angle allows for the lift, required to raise much of the hull over the surface of the water. At the same time, the lift is produced by resistance of the foil against the water. The necessary resistance unavoidably reduces efficiency and increases fuel consumption of the vessel.

Although ships on hydrofoils can be fast, they do not approach the speeds of aircraft. Vessels of such design are also a great cause of injury to whales, dolphines and other marine animals.

One solution over the limitations of the high-speed watercraft is to raise the craft above the surface of the water. Such solution has been attempted on the wing-in-ground vehicles, otherwise referred to as "ekranoplans," the most famous of which were developed for the Soviet navy by Rostislav Alexeev's constructor's bureau.

The term "ground effect" refers to the reduction in drag experienced by an aircraft as it approaches a height approximate to the size of the wingspan's length off the ground, sea, or other level surface. The effect increases as the wing descends closer to the ground, with the most significant effects occurring at a height of one half the wingspan length above the ground. The ground effect can otherwise be described as the cushion of high-pressure air created by the aerodynamic interaction between the wings and the surface.

Alexeev's designs showed very encouraging characteristics and tremendous promise. The "ekranoplans," of which the "Caspian Sea Monster" was the most famous, were some of the largest aircraft ever built, with a length of 73 m, rivaling that of the Hughes H-4 Hercules "Spruce Goose" and many modern jumbo jets. Their cargo load was far beyond the load imaginable with an airplane, and the speeds far exceeded anything possible with sea surface vessels. Tests of the Lun-class rocket-carrier ekranoplan also showed much improved stealth, speed, and operating costs, as compared to conventional rocket-carrying naval vessels.

Ekranoplans have been the subject of great interest for navies around the world, including the US navy. Several ekranoplans even entered service with the Soviet navy in the 1980s-1990s, although deficiencies in design prevented and still prevent the widespread use of ground-effect craft. One important deficiency was the lack of stability in flight. Another deficiency was the fact that this new unique vehicle type was designed, using the preconceptions of existing airplanes. Soviet Ekranoplans, as well as modern ground effect vehicles use traditional aircraft designs and solutions, to build what is essentially a marine vessel.

In fact, Soviet ekranoplans look exactly like large airplanes, except for the slightly-clipped wingspan. Such vehicles/vessels have little stability when idly floating on water or at low speeds. Large wing area makes them extremely prone to tipping over from gusts of wind or waves. This makes them dangerous to use, and all but unusable for one of their main intended purposes—as marine rescue vehicles.

Traditional airplane design, with wide wings and narrow fueselage, evolved for best performance at high speed in thin air, a medium with resistance 650 times less than that of water. The design of Alexeev's ekranoplans and their progeny is ill adopted for use on water or in direct proximity to water. The fragility was illustrated all too clearly when "Caspian Sea Monster" fell apart in test "flight" upon striking a wave.

In light of the shortcomings associated with traditional high-speed vessels and ground-effect craft, there is a long-standing and unsatisfied need in the art for a fast and economical craft. The craft should have the speed characteristics comparable with those of the ekranoplans, yet have seaworthy hull that will be stable at low and high speeds. The craft should be strong and capable of withstanding the impact of the waves. The craft should have aphibious capabilities, allowing the operation of craft at high speeds over water, as well as over ice, snow and other surfaces. The craft should also have the ability to rise above the height of the ground effect to pass over difficult terrain or stormy sea surface. The amphibious craft of the present invention achieves these objectives and provides numerous other benefits.

SUMMARY OF THE PRESENT INVENTION

The present invention is defined by the following claims and nothing in this section should be taken as a limitation on those claims.

The versatile watercraft of the present invention comprises a base wing, a C-wing, and at least one propulsion device. The base wing extends horizontally from the right side of the watercraft to the left side of the watercraft, and longitudinally, for at least a third, and preferably, more than a third, of the length of the watercraft. The base wing in preferred variants comprises a connector section and least one utilitarian section.

The C-wing extends above the base wing, and comprises at least two essentially vertical walls and an essentially horizontal top. Preferably the C-wing extends horizontally from the right side of the watercraft to the left side of the watercraft, and longitudinally, for at least a third of the length of the watercraft. Preferably, the two essentially vertical walls are connected to the base wing, thus forming a tunnel enclosure. The tunnel enclosure extends longitudinally above the base wing and under the C-wing.

The preferred embodiments of the versatile watercraft further comprise a plurality of (or preferably two) vertical stabilization knives. These vertical stabilization knives extend vertically below the base wing and extend longitudinally for at least a third of the length of the watercraft.

Preferred variants of the watercraft further comprise at least one bulkhead that vertically connects the base wing and the c-wing. The bulkhead extends longitudinally inside the tunnel enclosure, thus dividing the tunnel enclosure into at least two parallel subsections.

Preferably, the propulsion device is positioned inside the tunnel enclosure. Embodiments further comprising utilitarian cavities, horizontal and/or vertical rudders, external side wings, external cabin, and special raised bands for reducing the friction between the versatile watercraft and the surface of the water are also described and claimed.

BRIEF DESCRIPTION OF THE DRAWINGS

FIG. 2 is a side view of the embodiment of FIG. 1.

FIG. 3 is a sectional view of the embodiment of FIG. 2, taken along the line 3-3.

FIG. 4 is a sectional view of the embodiment of FIG. 2, taken along the line 4-4.

FIG. 5 is a rear side view of one of the preferred embodiments of the versatile watercraft of the present invention, comprising external side wings.

DETAILED DESCRIPTION OF THE PREFERRED EMBODIMENTS

Figure 1:
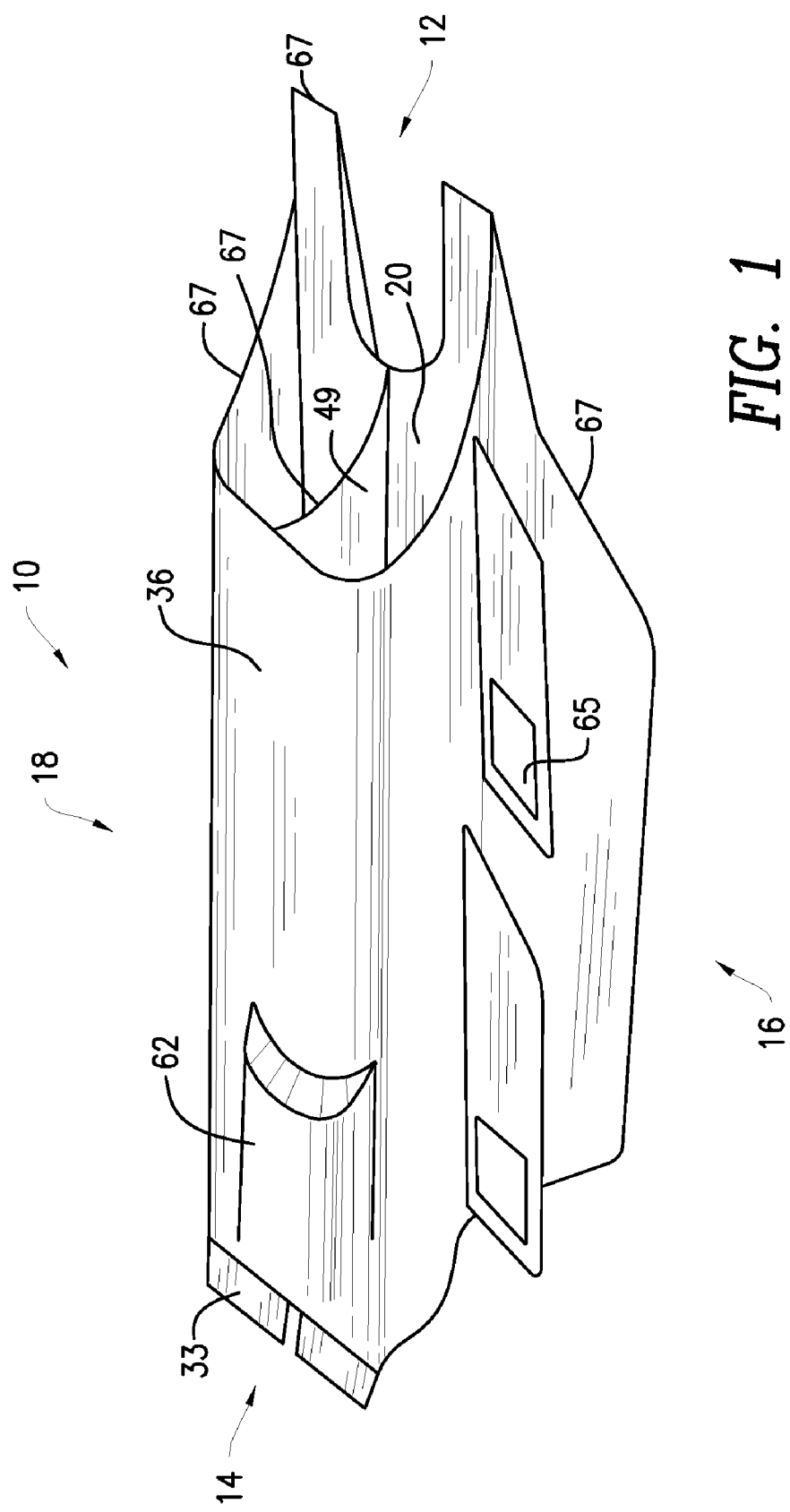
FIG. 1 is a perspective view of one of the preferred embodiments of the versatile watercraft of the present invention.

The apparatus of the present invention will now be illustrated by reference to the accompanying drawings. Preferred embodiments of the versatile watercraft of the present invention have been assigned reference numeral 10. Other elements have been assigned the reference numerals referred to below.

The device of the present invention, to as watercraft 10 (or craft 10) comprises the front end 12 of the watercraft 10, the rear end 14 of the watercraft 10, the right side 16 of the watercraft 10, and the left side 18 of the watercraft 10. The front end 12 and the rear end 14 of the watercraft 10 refer to the bow and the stern of the craft respectively and the right side 16 and the left side 18 refer to the sides of the watercraft 10 from the perspective of passenger of craft 10, facing the front end 12.

The craft 10 comprises a base wing 20. The base wing 20 extends horizontally from the right side of the watercraft 10 to the left side of the watercraft 10. The horizontal extension of the base wing 20 makes up much of the width of the watercraft 10 (as evident from the preferred embodiments of FIGS. 3 and 4), although in some embodiments (See FIG. 5), additional structures, such as wings and rudders extending (or extendable) from the sides of the craft 10 define the width of the craft 10.

The base wing 20 extends longitudinally (lengthwise) for at least a third of the length of the craft. In preferred embodiments the base wing 20 extends for more than a half of the length of the craft. The side view of a preferred embodiment on FIG. 2 illustrates the base wing 20 extending longitudinally for almost the entire length of the craft 10.

In the preferred variants, such as the variant of FIG. 4, the base wing 20 comprises a connector section 22 and least one utilitarian section 24. The utilitarian section 24 refers to the section of the base wing 20 that extends vertically below the connector section 22 and that may be used for passenger/cargo transport and/or other such utilitarian uses. The connector section 22 connects the utilitarian sections 24 (if present), to form a single base wing 20. In the preferred embodiment, such as the one on FIG. 4 the at least one utilitarian section 24 of the base wing 20 is a plurality of utilitarian sections, and preferably, two parallel utilitarian sections extending for most of the length of the craft 10 along the right and the left side of the base wing 20.

The base wing comprises a lower surface 28 of the base wing 20 and an upper surface 30 of the base wing 20. As shown in FIG. 3 and FIG. 4, the upper surface 30 of the base wing 20 is preferably relatively level, while the lower surface 28 of the base wing 20 preferably has several levels, with the bottom of the connector section 22 positioned higher than the bottom of the utilitarian section(s) 24 for most or all of the length of the craft 10.

The craft 10 further comprises a C-wing 36. The term C-wing refers to the resemblance of this wing with the semi-spherical shape of the letter "C" that is rotated 90-degrees clockwise, or the shape of the horizontally-stretched lowercase letter "n" that the preferred embodiments of the C-wing 36 have. Such shape of the C-wing 36 is illustrated on FIG. 1, FIG. 3 and FIG. 4. The C-wing 36 extends above the base wing 20 for at least some of the length of the craft 10. As shown in the preferred embodiment of FIG. 1, there may be some sections in the preferred embodiments where the C-wing 36 does not cover (i.e. extend over) the base wing 30 from above, and some sections where C-wing 36 extends further back than the base wing 30 in the rear end 14 of the craft 10.

The C-wing comprises at least two (and preferably two) essentially vertical walls 38 (vertical walls 38) and essentially horizontal top 40 (horizontal top 40). That is, the two vertical walls 38 are generally vertical along most of their height, but may in some embodiments be somewhat rounded, concave, convex, or have some angular incline from the 90 degrees. Similarly, the horizontal top is not strictly horizontal and preferably has some rounded features and in some embodiments is somewhat dome-shaped in cross-section. Preferred embodiment of FIG. 4, for example, illustrates some rounded features at the pont of connection of the vertical walls 38 and the horizontal top 40. In the preferred embodiments, the essentially vertical walls 38 are integrally connected to the horizontal top 40. In other preferred embodiments, two essentially vertical walls 38 of the C-wing are also integrally connected to the base wing in order to ensure the rigidity of the construction.

In contrast to the regular airplanes and ekranoplans, the craft 10 thus comprises two layers of wings—the base wing 20 and the C-wing. Surface area, as well as lift capacity of the two layers of wings in most embodiments exceeds one layer, found on today's planes and ekranoplans. In preferred embodiments this increased lift reduces, and in some embodiments, even eliminates the need for any additional external wings. This in turn reduces the width of the craft 10 in comparison with other airplanes and ekranoplans of similar hull sizes. It also reduces the vulnerabilities associated with wide wings in marine environments, such as the danger of striking the water surface 55 with the tip of the wing at high speeds.

The use of the C-wing 36, connecting two opposite sides of the base wing 20 also provides great rigidity and durability to the construction, allowing it to withstand greater shocks than traditional airplanes and ekranoplans. In some alternative embodiments, two or three layers of C-wings may be stacked on top of each other for increased lift.

The C-wing 36 in preferred embodiments extends horizontally from the right side of the watercraft to the left side of the watercraft, and longitudinally, for at least a third of the length of the watercraft, In preferred variants of the invention, the C-wing 36 has approximately the same width as the base wing 20. The two vertical walls 38 are preferably connected to the base wing. This connection between the base wing 20 and vertical walls 38 of the C-wing forms a tunnel enclosure 41 (or tunnel 41), with the upper surface 30 of the base wing 20 forming the floor of the tunnel 41. The tunnel enclosure 41 thus extends longitudinally above the base wing 20 and under the C-wing 36. Both sides of the tunnel 41 are open or substantially open.

In preferred embodiments, such as the embodiment of FIG. 2, the C-wing 36 also comprises one or more (preferably two) horizontally-extending rudders 33 (for vertical control of the craft 10) and (in alternative embodiments) also one or more vertically-extending rudders (for horizontal control) on the vertical walls 38. These rudders are positioned on the C-wing toward the rear end 14 of the craft 10.

The preferred variants of watercraft 10, further comprise at least one bulkhead 49, and in some embodiments, a plurality of bulkheads 49. The bulkhead 49 vertically connects the base wing and the c-wing, adding rigidity to the construction of the craft 10. The bulkhead 49 also extends longitudinally inside the tunnel enclosure, thus dividing the tunnel enclosure into at least two parallel subsections 43. The number of the bulkheads 49 depends on the height-width proportion of the tunnel 41, size of the craft 10, intended usage, weight, etc. The preferred embodiment illustrated on FIG. 1 comprises 1 bulkhead. In some embodiments bulkhead 49 comprises a vertically-positioned rudder 99 in the rear end 14 of the craft 10

The craft 10 further comprises at least one propulsion device 42, and preferably several propulsion devices 42. The propulsion device is a broad term, referring to a number of propulsion devices, such as, for example, aircraft jet engines/turbofans and propellers/fans used in preferred embodiments. However a number of engine types used in the aviation industry and for gliding vessels may be used in other embodiments.

The propulsion device (or devices) in preferred embodiments are positioned inside the tunnel enclosure 41. Such an installation of two turbofan engines inside the tunnel enclosure 41, on two sides of the bulkhead 49, toward the rear end of the craft 10 is illustrated on FIG. 4. Positioning of the propulsion device 42 inside of the tunnel 41 is preferred, as this ensures that the propulsion devices 42 take up the air that comes through the tunnel 41. The take-up by engine of air from the tunnel reduces the pressure inside of the tunnel 41 and is likely to increase speed and efficiency characteristics of the boat, among other benefits. In other embodiments, however the propulsion device (or devices) may be installed on the inner or outer surfaces of the C-wing 36, built into the rear end of the craft 10, or attached on any external wings, rudders or other surfaces.

The preferred embodiments of the invention, the craft 10 further comprise a plurality of vertical stabilization knives 44 (knives 44). Preferably, the plurality of vertical stabilization knives 44 refers to two knives 44. The knives are intended for maintaining contact with the water 55 when the craft 10 is traveling at high speeds, such as in ground effect mode (gliding above the surface of the water), and thus improving the stability of the craft 10, as most of the craft 10 is raised above the water.

The vertical stabilization knives 44 in preferred variants, as shown in FIG. 3, extend vertically below the base wing 20. Preferably, the vertical stabilization knives 44 are connected to the lower surface of the base wing 28 and extend downwards from the far right and far left sides of the lower surface of the base wing 28. However, in other embodiments, the knives may extend downward from any other surface of the craft 10, as long as the lower tips 46 of the knives 44 are lower than the lowest surface of the base wing 20.

Knives 44 extend longitudinally (i.e. along the length of the craft 10) for at least a third of the length of the watercraft 10, although preferably, they extend for most of the length of the watercraft 10. As the name suggests, knives 44 are long narrow blades, preferably with a sharp vertical edge in front, designed to cut through the water 55 with minimal effort or resistance. Knives 44 are preferably long enough vertically to stay in contact with the water, as the craft 10 accelerates and rises out of the water, with the lower surface 28 of the base wing 20 being at the optimal height from the surface for the ground effect to take place. As most powerful ground effect occurs at a height of one half the wingspan length above the ground, the vertical length of the knives 44 should preferably be at least half the width of the craft 10. It is also preferable that knives 44 are long enough so that at least 10% of the knives' blade is submerged under water. In embodiments intended for use in shallow waters, the vertical length of the knives 44 may be significantly shorter than what is described above. In some alternative embodiments, the number of knives may exceed two.

As the craft 10 speeds forward, while hovering above the sea level under the ground effect, the lower tips 46 of the knives 44 are submerged under the water. In this state, the knives 44, the lower surface of the wing 28 and the surface of the water 55 create a space, closed on four sides and open in the front and in the rear.

This space is referred to as the ground effect space 48. The ground effect is often described as the cushion of resistance between the ground and the wings. That is, during the common landing of airplanes and the flight of airplane-like ekranoplans, the cushion is normally limited on two sides—on top by the wings of the airplane, and on the bottom—by the ground surface. In the embodiment described directly above, the cushion, formed in the ground effect space 48 is limited on four sides—by the base wing 20, water surface 55, and two knives 44. The knives thus act to limit the expansion of the ground effect cushion to the sides, beyond the ground effect space 48. By containing the ground effect within the ground effect space 48, the knives 44 enhance the lifting effect on the craft 10.

The exact length of the knives 44 should be determined by the width of the craft 10, as described above, as well as by the intended use of the craft 10. For example, some embodiments of the present invention are intended to be used over surfaces other than water 55 in addition to or instead of the use on water. Such surfaces may include snow and ice-covered surfaces, among others. In such embodiments, the lower tips 46 of the knives 44 are fitted with skis (or wheels) for landing and acceleration on solid surfaces. Obviously, in such embodiments, it would be preferable for the lower tips 46 of the knives 44 to remain above the ground surface, while the craft 10 hovers in ground effect. Therefore, vertically shorter knives 44 are preferable in such embodiments.

Alternatively, for seaworthy embodiments of the present invention, it may be advantageous to have knives 44 that are vertically much longer than half the width of the craft 10. Such embodiments with long knives 44 would be capable of keeping the lower tips 46 under the surface of the water 55 (thus providing stabilization and creating the ground effect space 46), while the rest of the craft 10 rises high above the surface of the water. This will allow the embodiment to move above the tips of high waves in inclement weather.

In order to accommodate for both scenarios that may be encountered by the craft 10, some alternative embodiments of craft 10 comprise extendable/retractable knives 44. In such embodiments, the knives 44 may be made telescopic, or extend from and retract into the base wing 20 and/or the vertical walls 38. In some alternative embodiments, the knives 44 may further comprise rudders for enhancing the maneuverability characteristics of the craft 10.

The connector section 22 of the base wing 20 comprises the top surface 50 of the connector section 22 and the bottom surface 52 of the connector section 22. In the preferred variants of the invention, the connector section 22 of the base wing 20 expands in height/thickness as it extends longitudinally from the front end 12 of the watercraft 10 toward the rear end 14 of the watercraft 10. FIG. 2. illustrates the wedge-like expansion of the connector section 22 from the front to the rear of the craft and a region of consistent height/thickness 54 (of the connector section 22), where the expansion stops, toward the rear end 14 of the watercraft 10.

Preferably, in the region of expansion 56 of the connector section 22, the top surface 50 of the connector section 22 remains horizontal as the bottom surface 52 of the connector section 22 expands downward. In some embodiments, the region of expansion 56 and the region of consistent height/thickness 54 may comprise one or more connector utilitarian cavities 58 for mechanisms or transport of fuel, cargo, passengers, etc.

The expansion of the connector section 22 is also illustrated in comparing FIG. 3 and FIG. 4. The latter image, being a section of the craft 10 taken further toward the rear end 14 of the craft 10 than FIG. 3, shows the connector section 22 extending lower down than it extends in FIG. 3. In this preferred embodiment, the utilitarian sections 24 extend still lower than the connector section 22 throughout the length of the craft 10.

As the craft 10 gains speed and goes into the water-surface-gliding, and then into the ground-effect flying mode, the slope formed on the lower surface 28 by the wedge-like longitudinal expansion of the connector section 22 creates additional increase in air pressure under the rear end of the craft 10. This additional increase in air pressure assists in supporting the craft 10 airborne and provides extra amortization.

In preferred embodiments, the horizontal top 40 of the C-wing 36 also expands in height/thickness as it extends longitudinally from the front end 12 of the watercraft 10 toward the rear end 14 of the watercraft 10. This expansion is illustrated on FIG. 2. In some preferred embodiments the expanded section of the C-wing comprises a C-wing utilitarian cavity 60 for installation of craft's mechanisms, or transport of fuel, cargo, passengers, etc. In some preferred embodiments, the essentially horizontal top 40 of the C-wing comprises an external cabin 62. This external cabin 62 is preferably attached to upper surface of the horizontal top 40 of the C-wing, as shown on FIG. 1.

The size of the cabin 62 will vary with the size of the craft 10. This invention anticipates the embodiments of the craft 10 in a wide range of sizes from several meters long to hundreds of meters long. In smaller one or two-person embodiments, the cabin 62 is the size of the pilot's cockpit, connected with the c-wing utilitarian cavity 60 for legroom. In larger embodiments, the cabin 62, the utilitarian cavity 60, the connector utilitarian cavities 58, the utilitarian sections 24, and other utilitarian compartments may be several floors high and/or capable of transporting hundreds of people and heavy cargo (such as tanks and other military equipment).

In order to reduce the friction with water surface 55 even further and to overcome the cohesion of water 55 at takeoff, some embodiments of the craft 10 comprise a plurality of raised bands 64 on the lower surface 28 of the base wing 20. The bands extend longitudinally for at least a third of the length of the watercraft 10 (and preferably for most of the length), extending in the direction from the nose end 12 of the watercraft 10 to the tail end 14. As the vehicle 10 accelerates on water, air trapped between the adjacent bands 64 travels along these bands 64 under the lower surface 28. Air bubbles, under the lower surface 28, create a layer of lubrication between the water 55 and the craft 10 reducing friction, and allowing the craft 10 to take off, overcoming the adhesion of water. Exhaust from the propulsion devices 42 or any other gas, such as gas from compressors aboard the craft may be channeled into the spaces between raised bands 64. For example, such gases may be released from apertures located between the raised bands at the nose end 12 of the craft 10.

Some variants of the craft 10 comprise a plurality (preferably one or two on each side for the total of two or four) of external horizontal rudders 65 (for adjusting the vertical direction of the craft 10). These external horizontal rudders 65 extend from the right side 16 of the watercraft 10, and the left side 18 of the watercraft 10 and are intended (among other things) to provide additional lift, stability and maneuverability to the craft 10 at high speeds. In some embodiments, the external horizontal rudders 65 are comprised within a horizontal frame for protection of the rudders 65 during mooring.

The craft 10 is intended to be truly versatile and usable in a variety of weather conditions. Thus it is foreseeable that in some situations, the use of the ground effect may be impossible or impractical. For example, the winds or the waves may be too strong for smaller embodiments of the craft 10 to "hover" over the top of the waves, with only knives 44 in contact with water, as it does in ground effect mode. Alternatively, the craft 10 may have to slow down for search and rescue operations. In such cases, the base wing 20 provides floatability to the craft 10, allowing the craft to operate at slow speeds as a displacement vessel. Low, rounded features of the design of the preferred embodiments, such as the embodiment of FIG. 1 accommodate the use of the vessel in this role, allowing the waves to simply roll over the side of the craft 10, much like they do over a submarine body.

Preferably, the features of the craft 10 in the front end 12 are all somewhat edged, allowing the craft 10 to operate in displacement mode in stormy seas by "cutting" into and through the waves. That is, the C-wing, the bulkhead, the base wing 20 and the knives 44 all comprise a sharp edge 67 in the front end 12 of the craft. The edge 67 is preferably somewhat curved to distribute the resistance of the water or air over the edge 67. The comparison of FIG. 3 and FIG. 4 reveals the thinner cross-section of the bulkhead, the C-wing and the base wing 20 toward the front end 12 (shown in FIG. 3) in comparison to the same features shown in FIG. 4 (a cross-section taken further toward the rear end 14). As the craft 10 "cuts" into the wave in stormy seas, the wave rolls over the C-wing or passes through the tunnel 41, without offering much frontal resistance to the craft 10. For such embodiments, it is preferred that the propulsion devices 42 are shielded from water or capable of operating in the presence of water.

In the presence of such propulsion devices, the craft 10 may also be usable for underwater submersion and travel. In fact, the streamlined features of the craft 10 would produce much lower resistance, lower noise/sonar signature and better efficiency than submarines of conventional rounded design. To initiate submersion of such embodiment of the craft 10, external rudders 65 may be pointed downward (i.e. raised in the rear) while the craft is moving forward over the surface of the water 55 to drive the craft 10 downward. Alternatively, some of the utilitarian compartments, such as utilitarian sections 24 may be flooded to accelerate descent.

Figure 6:
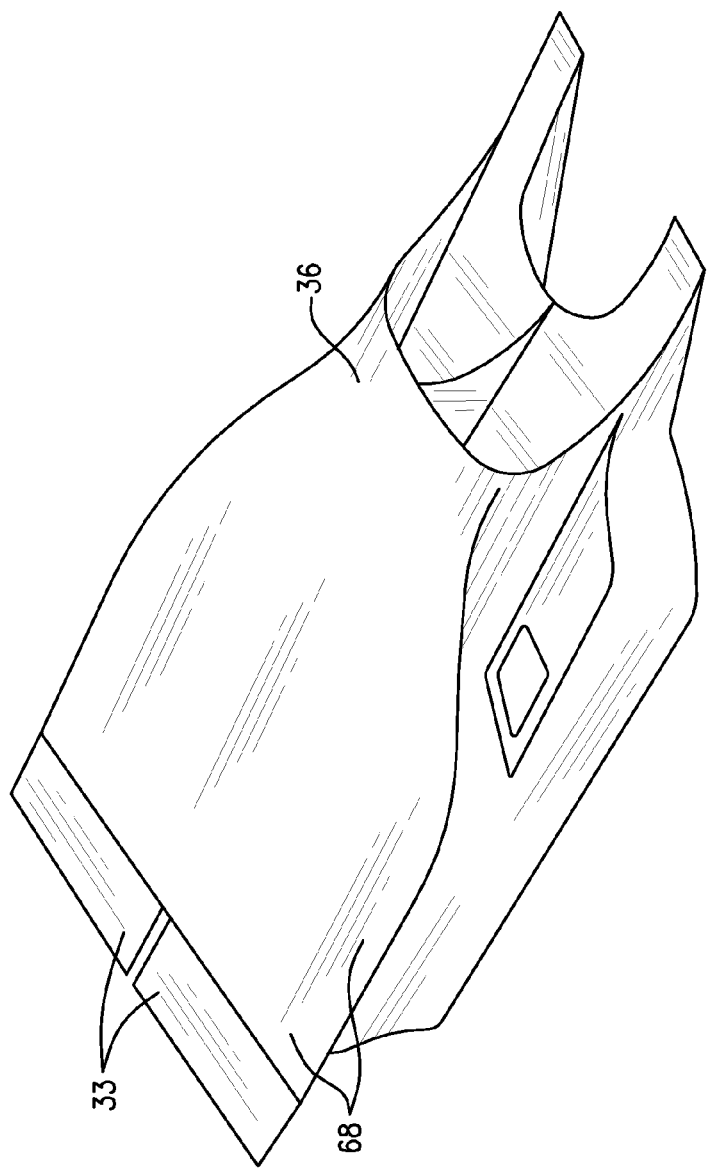
FIG. 6 is a perspective view of the embodiment of FIG. 5

In other situations, it may be desirable to raise the craft 10 above the height of the ground effect (the height roughly equivalent to wingspan or the height roughly equal to the width of the craft 10). Many embodiments of the craft 10 would have sufficient lift provided by the base wing 20 and the C-wing 36 to rise above the height of the ground effect and continue the flight as an airplane. Again, because of the low profile, extremely low resistance, and rigidity of construction the craft 10 is capable of attaining extremely high speeds in the air. In some embodiments, where take-off and landing at slower speeds or the ability to plane in the air is required, the craft 10 may also comprise a plurality of side wings 68. FIG. 5 and FIG. 6 depict such an embodiment with the side wings 68 extending from the right side 16 of the watercraft 10, and the left side 18 of the watercraft 10. In some embodiments, such as on the embodiment of FIG. 6, the side wings 68 are connected to the C-wing 36, and preferably to the horizontal top 40 of the C-wing 36. In some embodiments, the wings can be folded toward the craft's body, and unfoldable (in a manner similar to wings on the aircraft carrier planes), when and if required for flight.

The craft 10 can be constructed of a broad range of materials, particularly those in use for aircraft fuselage and vessel hull construction. The exact choice of materials depends on the intended use and size of the craft 10. Preferably, strong and lightweight materials, such as aluminum and composite materials are used. In preferred embodiments, much of the craft 10, including the base wing 20, the C-wing 35, and side-wings 68 (where present) are made of carbon-fibre reinforced plastic, glass-fibre reinforced plastic and quartz-fibre reinforced plastic. However, a multitude of other materials may be used, well known to those skilled in the art.

It is to be understood that while the apparatus of the present invention have been described and illustrated in detail, the above-described embodiments are simply illustrative of the principles of the invention and the forms that the invention can take, and not a definition of the invention. It is to be understood also that various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the following claims.

I claim:

1. A versatile watercraft comprising:
   a front end of the watercraft, a rear end of the watercraft, a right side of the watercraft, and a left side of the watercraft, the watercraft further comprising:
   a. a base wing, extending horizontally from the right side of the watercraft to the left side of the watercraft, the base wing comprising a lower surface of the base wing and an upper surface of the base wing;
   b. a C-wing, the C-wing extending above the base wing, and the c-wing comprising at least two essentially vertical walls and an essentially horizontal top,
   c. at least one propulsion device;
   d. a plurality of vertical stabilization knives, the vertical stabilization knives extending vertically below the base wing and extending longitudinally for at least a third of the length of the watercraft,
   wherein each vertical stabilization knife of the plurality of vertical stabilization knives is a narrow blade
   and wherein the vertical length (height) of each of the vertical stabilization knives is at least half the width of the watercraft, and
   e. wherein
   the base wing longitudinally extends for more than two-thirds of the length of the watercraft, and wherein
   the base wing comprises a connector section and least one utilitarian section
   f. and wherein the C-wing extends horizontally from the right side of the watercraft to the left side of the watercraft, and longitudinally for at least a third of the length of the watercraft,
   g. and wherein the at least two essentially vertical walls are connected to the base wing, thus forming a tunnel enclosure, said tunnel enclosure extending longitudinally above the base wing and under the C-wing,
   said essentially vertical walls defining the limits of the width of the base wing.

2. The watercraft of claim 1,
   a. further comprising at least one bulkhead, said at least one bulkhead vertically extending straight down along at least three-fourths of its length and connecting the base wing and the c-wing, and extending longitudinally inside the tunnel enclosure for at least a third of the length of the tunnel enclosure, thus dividing the tunnel enclosure into at least two parallel subsections, and wherein
   b. the plurality of vertical stabilization knives is two vertical stabilization knives.

3. The watercraft of claim 2, wherein the vertical stabilization knives are connected to the base wing and extend downward from the lower surface of the base wing.

4. The watercraft of claim 2, wherein
   a. the at least one utilitarian section of the base wing is a plurality of utilitarian sections,
   and wherein
   b. the at least one bulkhead is a plurality of bulkheads.

5. The watercraft of claim 2, wherein the connector section of the base wing expands in height/thickness uniformly along its width as it extends longitudinally from the front end of the watercraft toward the rear end of the watercraft.

6. The watercraft of claim 5, wherein the connector section of the base wing comprises a top surface of the connector section and a bottom surface of the connector section, and wherein,
   the top surface of the connector section remains horizontal as the bottom surface of the connector section expands downward.

7. The watercraft of claim 4, wherein the plurality of utilitarian sections is two utilitarian sections, and wherein
   the two utilitarian sections of the base wing are positioned to extend below the connector section of the base wing.

8. The watercraft of claim 1, wherein the C-wing extends further back than the base wing in the rear end of the watercraft.

9. The watercraft of claim 2, wherein the essentially horizontal top of the C-wing expands uniformly along its width in height/thickness as it extends longitudinally from the front end of the watercraft toward the rear end of the watercraft, and wherein the C-wing comprises a C-wing utilitarian cavity said cavity internally enclosed inside of the C-wing.

10. The watercraft of claim 1, wherein the at least one propulsion device is positioned inside the tunnel enclosure.

11. The watercraft of claim 1, further comprising a plurality of external horizontal rudders, said external horizontal rudders extending from the right side of the watercraft, and the left side of the watercraft.

12. The watercraft of claim 1, further comprising a plurality of external side wings, said side wings extending from the right side of the watercraft, and the left side of the watercraft.

13. The watercraft of claim 1, further comprising a plurality of raised bands on the lower surface of the base wing, said bands extending longitudinally for at least a third of the length of the watercraft, extending in the direction from the front end of the watercraft to the rear end of the watercraft.

14. The watercraft of claim 1, wherein the two essentially vertical walls of the C-wing are integrally connected to the base wing.

15. The watercraft of claim 2, wherein the essentially horizontal top of the C-wing comprises an external cabin, said external cabin attached to the upper surface of the essentially horizontal top of the C-wing.

* * * * *